United States Patent Office 3,234,662
Patented Feb. 15, 1966

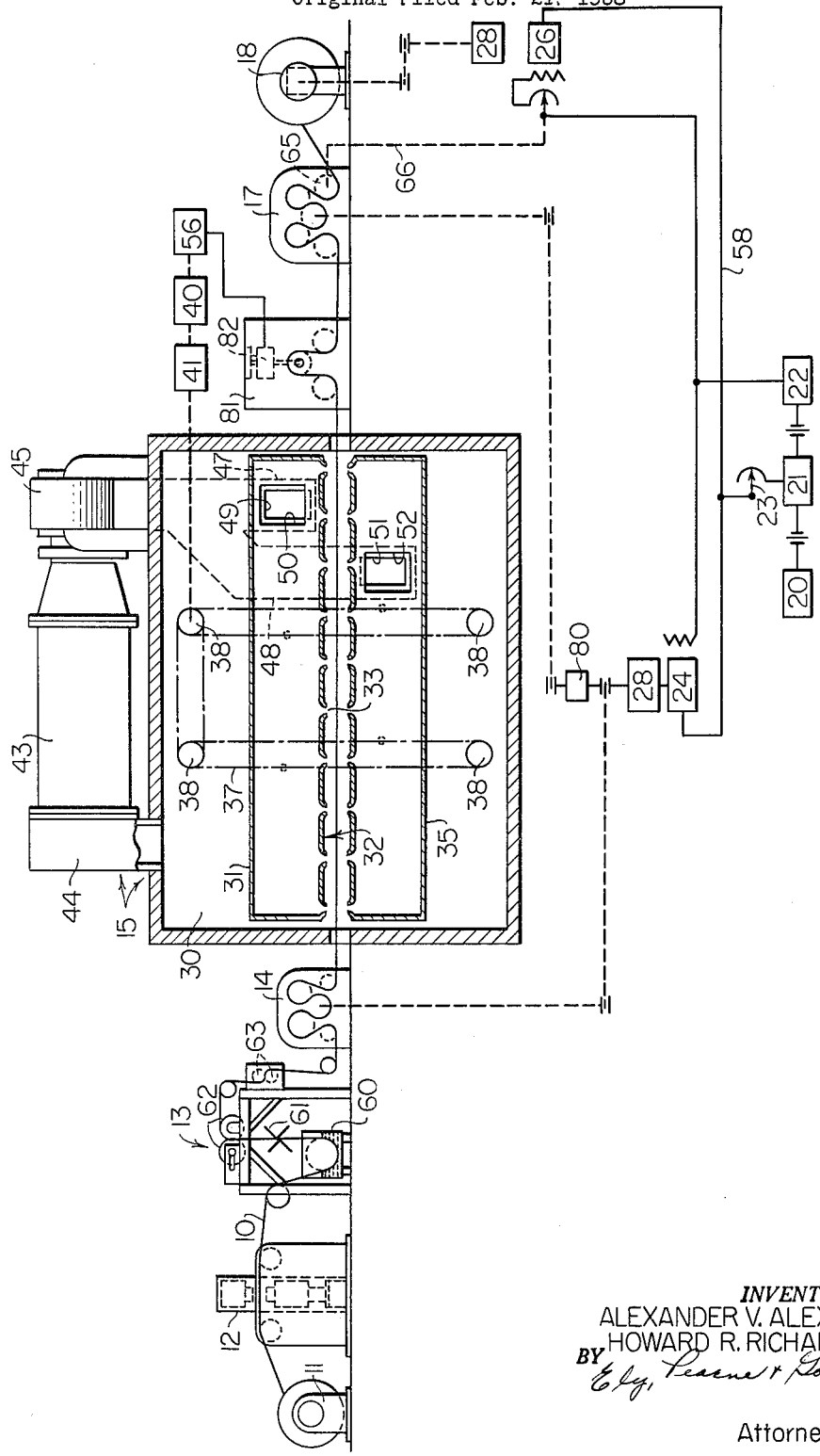

3,234,662
WEB AND STRAND TREATING APPARATUS
Alexander V. Alexeff, Cleveland, and Howard R. Richards, Lakewood, Ohio, assignors to Industrial Ovens, Incorporated, Cleveland, Ohio, a corporation of Ohio
Original application Feb. 21, 1958, Ser. No. 716,791, now Patent No. 3,124,429, dated Mar. 10, 1964. Divided and this application Jan. 5, 1961, Ser. No. 80,769
5 Claims. (Cl. 34—49)

This is a division of application Serial No. 716,791 filed February 21, 1958, now Patent No. 3,124,429.

The present invention relates to heat treatment of webs and strands and particularly to method and apparatus for attaining very precise and responsive temperature control of the treated material. For purposes of this application "strands" is to be understood to include monofilaments such as nylon, rayon, and glass fiber as well as wires, cords, narrow tapes and tubings, and "strips" is to be understood to include strands and also webs such as metal sheet, paper, textiles, films and wide tapes.

In numerous present-day continuous or semi-continuous processes for the heat treatment of strip, it is desirable to maintain a high degree of uniformity of treatment of the strip from increment to increment of its length. This is particularly desirable where the treatment can be wholly satisfactory only when carried out within narrow critical ranges of conditions.

A purpose of the present invention is to control heat input into a strip in such a manner as to achieve a high degree of uniformity of treatment from increment of strip length.

It is to be understood that although the controls and the particular heating means described herein presently appear to be ideally suited to each other and to the optimum practice of the invention, nevertheless some of the advantages of the controls contemplated by the invention may be realized when other heating means are used, such as the variable length ovens shown in the copending patent application of Alexander V. Alexeff, Edwin P. Homburg and Howard Richards, Serial No. 456,691, filed September 17, 1954, now U.S. Patent 2,837,834.

Accordingly, it will be clear that the invention may be embodied either in the heating means alone or in the control means alone, or in both together.

The objects and advantages of the invention will become apparent from the following description of specific embodiments of the invention. As will be apparent to those familiar with web or strand processing, specific mechanical, electrical or hydraulic equipment components to be employed in any give installation are a matter of choice within the routine skill of the art. Suitable components in each illustrated embodiment are, therefore, illustrated schematically in the interest of clarity in order that the invention itself may be most concisely and completely disclosed and understood.

The drawing is a partly schematic and partly diagrammatic illustration of a semi-continuous web processing system employing the invention.

The figure illustrates a semi-continuous installation in which the invention is employed. The illustrated installation might be employed for dipping a web in a bath, the web then being heated, dried, and simultaneously stretched under considerable tension. In such "hot stretching" it is frequently desirable to maintain conditions as constant as possible from increment to increment of the web length in order to be able to maintain as closely as possible ideal conditions of treatment or in order to approach as closely as possible upper critical limits, such as the upper temperature limits which, if reached, will damage the material but which it is desirable to approach as closely as possible to effect best results. In the illustration the web is indicated by the reference numeral 10.

The main components of the installation shown in FIGURE 1 comprise a let off stand 11, a splice press 12, a dip station 13, a first high-tension-capacity pull roll stand 14, heating means indicated generally by the reference numeral 15, a dancer roll length-sensing stand 16, a second high-tension-capacity pull roll stand 17, and a wind up stand 18.

The installation may employ, in any conventional manner, a plurality of variable speed D.C. motors as a power and control means for the several web driving members. The power and control system may comprise a motor 20, a generator 21, a field exciter 22, an overriding or governing speed control rheostat 23, and a plurality of voltage responsive, variable speed D.C. motors 24 and 26.

The speed control rheostat 23 governs the speed of the motors 24 and 26. There is a positive relationship between the drives of the stands 14 and 17, the stand 17 being driven at a slightly greater speed than the stand 14, as indicated schematically by the intervening fractional speed changer 80. Since the stands 14 and 17 are positively interconnected to maintain a definite speed difference, the amount of stretch occurring between them remains a constant.

The heating means, according to one aspect of the present invention, comprises a chamber 30 through which the web 10 reaches. At least one duct 31 extends along such reach of the web 10 and has a face 32 in apposition to such reach. Gas emitting outlets 33 are provided in such face. In the particular apparatus shown, the upper duct 31 is duplicated by a lower duct 35 which is similar in all respects to the upper duct but which extends along the opposite side of such reach of the web 10 within the chamber 30.

There is provided means to translate the ducts 31 and 35 within the chamber 30 toward and away from such reach of the web 10 to vary the distance of the opposite faces of the ducts 31 and 35 from such reach. For this purpose, the ducts 31 and 35 may be hung from or coupled with endless cables or chains 37. Each cable or chain passes around asociated sprockets or sheaves 38 which are coupled together by a secondary chain and sprocket linkage 39 and which are powered by a reversible motor 40 through a speed reducer 41. It will, of course, be understood that other equivalent mechanisms may be employed to shift the duct or ducts, the choice of the most desirable mechanism being a matter of mechanical expediency in the particular circumstances and conditions.

As a part of the heating means 15, there is provided an air heater 43 of any suitable conventional type. There is also provided means to guide air for circulation from the chamber 30 through the heater 43 and to the duct 31, and also to the duct 35 where two ducts are employed as in the illustrated appartus. This means includes an exhaust duct 44, a blower 45, an input duct 46 leading from the blower and branch ducts 47 and 48, the latter being employed only when two moving ducts are furnished. The ducts 47 and 48 extend down the side wall of the chamber 30. The duct 47 has a port 49 opening into the chamber 30. This port 49 communicates with a port 50 formed in the side of the moving duct 31. Ports 51 and 52 are similarly associated with the duct 48 and moving duct 35, respectively. It will thus be seen that air emitted from the gas emitting openings 33 (and from the similar openings associated with the duct 35 if two moving ducts are employed) is recirculated through the heater 43 back through the gas emitting openings. The rate of heating of the web can be very quickly varied by activating the means to translate the moving duct or ducts, such means in the illustrated case comprising the motor 40, speed reducer 41, and sheaves, cables and associated drive means 37–39.

It should be understood that a significant advantage of the illustrated variable heating means is that even with other variables (such as air temperature and volume of air translation) remaining constant, nevertheless the absolute heat input to the web 10 can be considerably varied at a constant web speed by moving the ducts toward and away from the web to vary the relative velocity between the web and the hot air emitted from the duct or ducts 31 and 35. This relative velocity is higher as the duct or ducts are moved closer to the web and therefore there occurs quick variation of the coefficient of heat transfer between the gas and the surface.

Through a tension sensing element 65 and a suitable linkage 66 associated with the stand 17, the motor 26 is controlled to maintain the desired web length between the drive stand 17 and the take up stand 18, as indicated in FIGURE 1.

During passage from the let off stand or roll 11 to the drive stand 14, the webbing is illustrated as being processed at the dipping station 13, the web being dipped into a coating liquid 60, then passing between scraper bars 61, squeegee rolls 62 and beater bars 63.

There is provided a dancer stand 81 which is in effect a tension sensing stand. The dancer roll in the stand 81 is not free to move up and down but acts only to impose different stresses on a standard load cell or tension sensing cell 82 which, in turn, supplies its output voltage (which varies directly with imposed stress) to the control potentiometer 56. Accordingly, the heat input of the heating means 15, as determined by the position of the ducts 31 and 35, is governed in response to the tension of the web 10 in the reach passing through the chamber 30. As the tension increases from the desired value, the control potentiometer 56 causes the motor 40 to move the duct toward the web 10 thereby increasing heat input and decreasing tension, stretch being held at a constant. As the tension is decreased from the desired value, the control potentiometer 56 causes the motors to operate to move the ducts 31 and 35 away from the web 10 tending to decrease heat input and therefore increase tension. Accordingly, it will be seen that in the illustrated embodiment, stretch is maintained at a constant and the tension in the web within the chamber 30 controls the amount of heat input to the web 10.

While the above disclosure and claims generally refer to air heating means and to treating by hot air, it will be understood that the invention is applicable to heat treatment by other gases and in fact to other fluid treatment procedures other than heat treatment where an agent other than heat (for example, moisture, or a solvent for the strip material) is imposed on a strip and is of such character as to tend to decrease the tension of the strip and increase the length of the strip. In this connection, the term "air" in the appended claims is to be understood to cover other gases which are equivalent to air for the purposes of this application.

The above discussion of the invention should make it apparent that the invention may be embodied in many different specific strip processing set-ups. The disclosure of the invention will suggest to the art many possibilities for specific installations which are especially designed to meet particular conditions and operating requirements. The scope of the invention is therefore not to be limited to details of the embodiments disclosed above but is to be defined by the claims set forth below.

What is claimed is:

1. In continuous and semi-continuous strip treating apparatus, heating means for heating a strip at a controllable and variable rate, a feed-in drive feeding said strip to said heating means, a feed-out drive feeding said strip from said heating means, means to maintain a selected differential by which the rate of said feed-out drive exceeds the rate of said feed-in drive whereby said strip is stretched a constant amount in passing between said feed-in drive and said feed-out drive, and means for varying the heating rate of said variable-rate heating means as a direct function of the tension of said strip between said feed-in and feed-out drives.

2. Apparatus as defined in claim 1 in which said first mentioned means comprises a chamber through which said strip reaches, at least one duct extending along said reach of said strip and having a face in apposition to said reach, gas-emitting outlets on said face, means to translate said duct within said chamber toward and away from said reach to vary the distance of said face from said reach, an air heater, means to guide air for circulation from said chamber through said air heater and to said duct, whereby air emitted from said gas-emitting openings is recirculated through said air heater and the rate of heating of said strip can be quickly varied by activating said means to translate said duct.

3. In continuous and semi-continuous strip treating apparatus, heating means for heating a strip at a controllable and variable rate, means to feed said strip through said heating means and stretch said strip a constant amount in so feeding it and means for varying the heating rate of said variable-rate heating means as a direct function of the tension of said strip in said heating means.

4. In continuous and semi-continuous strip treating apparatus, treating means for applying a treating agent to strip at a controllable and variable rate, a feed-in drive feeding said strip to said treating means, a feed-out drive feeding said strip from said treating means, means to maintain a selected differential by which the rate of said feed-out drive exceeds the rate of said feed-in drive whereby said strip is stretched a constant amount in passing between said feed-in drive and said feed-out drive, and means for varying the treating rate of said variable-rate treating means as a direct function of the tension of said strip between said feed-in and feed-out drives.

5. In continuous and semi-continuous strip treating apparatus, means for treating a strip with an agent at a controllable and variable rate, means to feed said strip through said treating means and stretch said strip a constant amount in so feeding it and means for varying the treating rate of said variable-rate treating means as a direct function of the tension of said strip in said treating means.

References Cited by the Examiner

UNITED STATES PATENTS

| | | | |
|---|---|---|---|
| 866,513 | 9/1907 | Pickles | 34—49 |
| 2,166,379 | 7/1939 | Skagerberg | 34—49 |
| 2,288,129 | 6/1942 | Feldhavsen | 34—54 |
| 2,955,342 | 10/1960 | Litzler | 26—54 |

WILLIAM F. O'DEA, *Acting Primary Examiner.*

BENJAMIN BENDETT, GEORGE D. MITCHELL, NORMAN YUDKOFF, *Examiners.*